US007225860B2

(12) United States Patent
Baginski et al.

(10) Patent No.: US 7,225,860 B2
(45) Date of Patent: Jun. 5, 2007

(54) COMPACT HEAT BATTERY

(75) Inventors: Ben Baginski, Santa Ana, CA (US); Hal Strumpf, Rancho Palos Verdes, CA (US); Carlos E. Alvarez, Torrance, CA (US)

(73) Assignee: Honeywell International, Inc., Morristown, NJ (US)

( * ) Notice: Subject to any disclaimer, the term of this patent is extended or adjusted under 35 U.S.C. 154(b) by 128 days.

(21) Appl. No.: 11/197,165

(22) Filed: Aug. 3, 2005

(65) Prior Publication Data
US 2007/0029064 A1    Feb. 8, 2007

(51) Int. Cl.
*F24H 7/02* (2006.01)
*F28D 17/00* (2006.01)

(52) U.S. Cl. .................................. 165/10; 126/400
(58) Field of Classification Search ............... 126/400, 126/618, 634, 641, 643–645; 165/10, 104.1
See application file for complete search history.

(56) References Cited

U.S. PATENT DOCUMENTS

| 4,094,302 | A | * | 6/1978 | Rohr ...................... 126/400 |
| 4,104,185 | A | * | 8/1978 | Schroder ................... 165/10 |
| 4,259,401 | A |   | 3/1981 | Chahroudi et al. |
| 4,262,653 | A | * | 4/1981 | Holland ................... 126/400 |
| 4,392,480 | A | * | 7/1983 | Vautrin ................... 126/400 |
| 4,463,799 | A |   | 8/1984 | Takahashi et al. |
| 4,807,696 | A |   | 2/1989 | Colvin et al. |
| 4,953,628 | A |   | 9/1990 | Yamashita |
| 5,441,097 | A | * | 8/1995 | Kanda et al. ................. 165/10 |
| 5,687,706 | A |   | 11/1997 | Goswami et al. |
| 6,059,016 | A |   | 5/2000 | Rafalovich et al. |
| 2004/0211407 | A1 |   | 10/2004 | Terashima et al. |

OTHER PUBLICATIONS

Popescu, A. et al., Thermal Energy Storage for Autovehicles: Source of Energy and Clean Environment, Proceedings of the 7th International Energy Conference (ENERGEX '98) Nov. 19-21 1998, Bahrain.

* cited by examiner

*Primary Examiner*—Teresa J. Walberg
(74) *Attorney, Agent, or Firm*—Oral Caglar, Esq.

(57) ABSTRACT

A compact heat battery (CHB) may comprise a casing, a tube containment sheath, a bundle of hermetically sealed phase change material (PCM) encapsulation tubes, and encapsulation tube inserts. An insulation envelope and insulation shield may be positioned radially outward from the casing. As an alternative the casing, insulation, and insulation shield can be integrated into a double-walled vacuum cylinder. The cylindrical containment sheath can open and close along a split-seam in response to radial expansion of the tubes. The natural packing of the encapsulation tubes within the containment sheath can distribute a heat transfer fluid through the interstitial spaces between the encapsulation tubes. Floating baffle plates provide for axial containment and expansion of the encapsulation tube bundle. The CHB of the present invention can allow for increased tube density, providing increased heat absorption and decreased CHB dimensions. The encapsulation tube inserts can provide slip planes to reduce expansive loading of the encapsulation tube walls during solid phase transition.

24 Claims, 12 Drawing Sheets

COMPACT HEAT BATTERY

BACKGROUND OF THE INVENTION

The present invention generally relates to thermal energy storage systems and, more particularly, to systems utilizing phase change materials.

Vehicles and electronic devices often require a means for storing or absorbing large amounts of heat. The heat may be stored or absorbed at temperatures that make it available for later dissipation.

A thermal energy storage system may transfer heat via a heat transfer fluid, such as ethylene glycol/water, to a thermal energy storage material. Thermal energy storage systems store energy by heating, melting, or vaporizing the thermal energy storage material. The energy becomes available as heat when the process is reversed and the material is cooled, solidified, or liquefied. In some systems heat may be stored by raising or lowering the temperature of a material without changing its phase: This is known as sensible heat storage. In some systems heat may be stored by causing a phase change in a material: This is known as latent heat storage. Both sensible and latent heat storage may occur in the same material.

The use of phase change materials (PCMs) in thermal energy storage systems is known in the art. PCMs can store thermal energy, latent heat, by transitioning from solid to liquid or from liquid to vapor. As a solid PCM is heated its temperature increases until it reaches its melting temperature. At its melting (transition) temperature, the PCM remains in the solid phase while it absorbs a fixed amount of heat known as the "latent heat of fusion" (also called the "latent heat of crystallization"). Once the PCM absorbs the latent heat of fusion, it changes phase from solid to liquid. To reverse the process heat is removed from the PCM. Its temperature decreases until it reaches the PCM's fusion temperature. The PCM stays in the liquid phase until it releases an amount of heat equal to the latent heat of fusion. As the PCM continues to loose heat, the PCM changes from the liquid phase to the solid phase. Absorbing and releasing the latent heat of fusion at a characteristic transition temperature allows the PCM to store relatively large amounts of heat without having to be raised to correspondingly high temperatures. Thus a given mass of PCM can store relatively more heat at a given temperature than the same mass of a single-phase material using only its sensible heat capacity. PCMs have been used in many industries for heat storage. PCMs have been packaged in containers such as tubes, shallow panels and plastic bags or encapsulated as self-contained grains.

U.S. Pat. No. 5,687,706 discloses a heat storage system utilizing a PCM. The described system comprises a packed-bed slurry of encapsulated PCM pellets with a heating element. This system is specifically designed to inhibit vertical thermal convection and can only be used in a vertical configuration making it unsuitable for some applications.

U.S. Pat. No. 6,059,016 describes a thermal energy storage and delivery system for delivering thermal energy to both a passenger compartment of a vehicle and a component, such as a battery. In some embodiments of the disclosed system, the bulk mass of the PCM is in direct contact with both a vehicle hot fluid and a vehicle cold fluid with the fluid flow depending on electro-mechanical control systems. In some embodiments of the disclosed system, the PCM is encapsulated and used in a cross-flow tube-and-shell arrangement. The PCM encapsulation tubes require corrugations to mitigate expansive loading which reduces tube packing density for some applications. For some applications a reduction in tube packing density results in a corresponding reduction in heat absorption by the storage system.

U.S. Pat. No. 4,807,696 provides a PCM heat storage system. The system comprises a housing defining a chamber and having an inlet and an outlet. An aluminum honeycomb matrix is positioned within the chamber and filled with macrocapsules. The macrocapsules have a PCM core and an encapsulating outer shell. The honeycomb matrix divides the flow of heat transport fluid into separate flow streams channeling the flow streams from the inlet to the outlet. Although this system may be used to store thermal energy, the reduction in PCM packing density due to the honeycomb matrix results in a system efficiency reduction for some applications. For some space-limited applications the described system may not provide sufficient heat storage and a more densely packed PCM arrangement may be desired.

Thus there is a need for an improved thermal energy storage system: A system is needed that is not limited to a vertical configuration, a storage system is needed that mitigates expansive loading without the need for encapsulation tube corrugations; and, a thermal energy storage system is needed wherein PCM packing density is increased.

SUMMARY OF THE INVENTION

In one aspect of the present invention, an assembly comprises a casing having a casing cylinder, a first end cap and a second end cap; a tube containment sheath positioned radially inward from the casing cylinder; and at least one encapsulation tube positioned radially inward from the tube containment sheath, the encapsulation tube including a phase change material.

In another aspect of the present invention, an assembly comprises a cylindrical pressure vessel having a chamber; a tube containment sheath disposed within the chamber, the tube containment sheath having a split-seam; and at least one encapsulation tube positioned radially inward from the tube containment sheath.

In still another aspect of the present invention, an assembly comprises a casing having a casing cylinder, an inlet-outlet plenum cap and a turning section; a cylindrical member positioned radially inward from the casing cylinder such that a circumferential gap is formed; and a bundle of encapsulation tubes positioned radially inward from the cylindrical member, the bundle of encapsulation tubes including a thermal energy storage material.

The present invention may comprise a shielded and insulated cylindrical pressure vessel. The shielding, insulation, cylindrical pressure vessel, and its contents may be called a compact heat battery.

In one aspect of the present invention the shielding, insulation, and casing of the cylindrical pressure vessel are each separate concentric layers of material. The shielding material, the outermost layer, may or may not be present depending on the desired durability and contamination resistance of the thermal battery package. The shielding layer would most likely be present only with the insulation layer to protect the insulation from damage, degradation, and contamination.

The next layer radially inward may be the insulation layer. The insulation layer may or may not be present depending on the desired storage duration of the contained heat within the thermal battery. Including an insulation layer decreases parasitic heat leakage from the thermal battery thus increasing usable heat available on-demand from the compact heat battery.

In this aspect of the present invention, the third layer radially inward may be the pressure vessel casing with end caps. The end caps may be flat or have a curvilinear profile. The casing with end caps is the primary structure for transmitting and absorbing mechanical loads for the compact heat battery and will contain the heat transport fluid pressure loading.

An alternative aspect of the present invention is to integrate the insulation and casing into an evacuated, sealed, double-walled, vacuum container. The evacuated void may itself function as a sufficiently insulating barrier or the evacuated void may be filled with additional insulating material. In this alternative aspect of the present invention the outer wall of the double-walled vacuum container functions as the shield layer and the inner wall functions as the pressure vessel of the compact heat battery.

In all aspects of the present invention the remaining internal components of the thermal battery may "float" within the pressure vessel casing. The internal components are not subject to any primary mechanical loading from the environment outside the thermal battery and they are not subject to any pressure loading from the heat transport fluid differential pressure potential.

Inside the pressure vessel casing may be two perforated baffle plates and a bundle of hermetically sealed PCM encapsulation tubes. The two baffle plates placed at each end of the tube bundle prevent flow of the PCM encapsulation tubes or tube bundle into the end caps plenum from either end. However, the two baffles plates do not restrict flow of the heat transport fluid into and through the tube bundle.

The PCM encapsulation tubes are held in compression by a semi-split cylinder called the PCM tube containment sheath. The inner diameter of the semi-split cylinder is designed and packed to hold the PCM encapsulation tubes in slight compression at ambient assembly temperature. The PCM tube containment sheath fits into the pressure vessel casing with a radial gap designed to allow maximal expansion of the tube bundle with only negligible case expansion loads at the end of radial expansion travel.

The non-perforated perimeter of the PCM baffle plates resists most of the axial bypass flow of the heat transport fluid. This prevents bypass flow of the heat transport fluid around the PCM tube bundle and into the expansion gap. Alignment stops in the circumference of the casing allow the baffle plates to float and travel a small axial distance within the casing to allow for axial expansion of the PCM tube bundle.

The PCM encapsulation tubes are hermetically sealed and contain a small fraction of the total mass of PCM. Each tube volume will accommodate the required amount of expansion both from the liquid and solid phase expansion of the PCM as well as for the volume change during phase transition. Hence, in solid phase there will be a significant void, ullage space, in each tube.

A large number of maximally packed PCM tubes provide sufficient area and heat transfer coefficient to discharge the desired amount of heat at a rate necessary to meet a desired discharge rate.

Each PCM encapsulation tube may contain an insert. The thin fan-folded insert spans the entire axial length of the tube. This insert creates mechanically induced slip planes in the PCM during PCM solidification. The insert material is non-reactive with PCM, has low surface friction, and is shaped to relieve expansion loads when the PCM solidifies.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides thermal energy storage systems and methods for producing the same. Embodiments of the present invention may find beneficial use in many industries including automotive, optics, electricity generation and aerospace. Embodiments of the present invention may be beneficial in applications including high power lasers, automotive, and electron optical electronics. Embodiments of this invention may be useful in any heat absorption or heat storage application.

In one embodiment, the present invention provides a thermal energy storage system. The system may comprise a cylindrical casing and a bundle of encapsulation tubes disposed lengthwise within the casing. The bundle of encapsulation tubes may be held in compression by a split-seam cylindrical sheath. A pair of perforated disks, one positioned at each end of the cylindrical sheath, may restrict axial movement of the encapsulation tubes to prevent inlet/outlet blockage by the tubes. Unlike the prior art that requires tube corrugations to mitigate expansive loading, the cylindrical sheath of the present invention can open and close along the split-seam in response to radial expansion of the tubes.

Unlike the prior art that requires a honeycomb matrix for heat transfer fluid distribution, the natural packing order of the encapsulation tubes within the containment sheath may distribute the heat transfer fluid through the interstitial spaces between the encapsulation tubes. The system of the present invention allows for more densely packed tubes and thus more available PCM mass when compared to a system requiring a honeycomb matrix.

Figure 1:
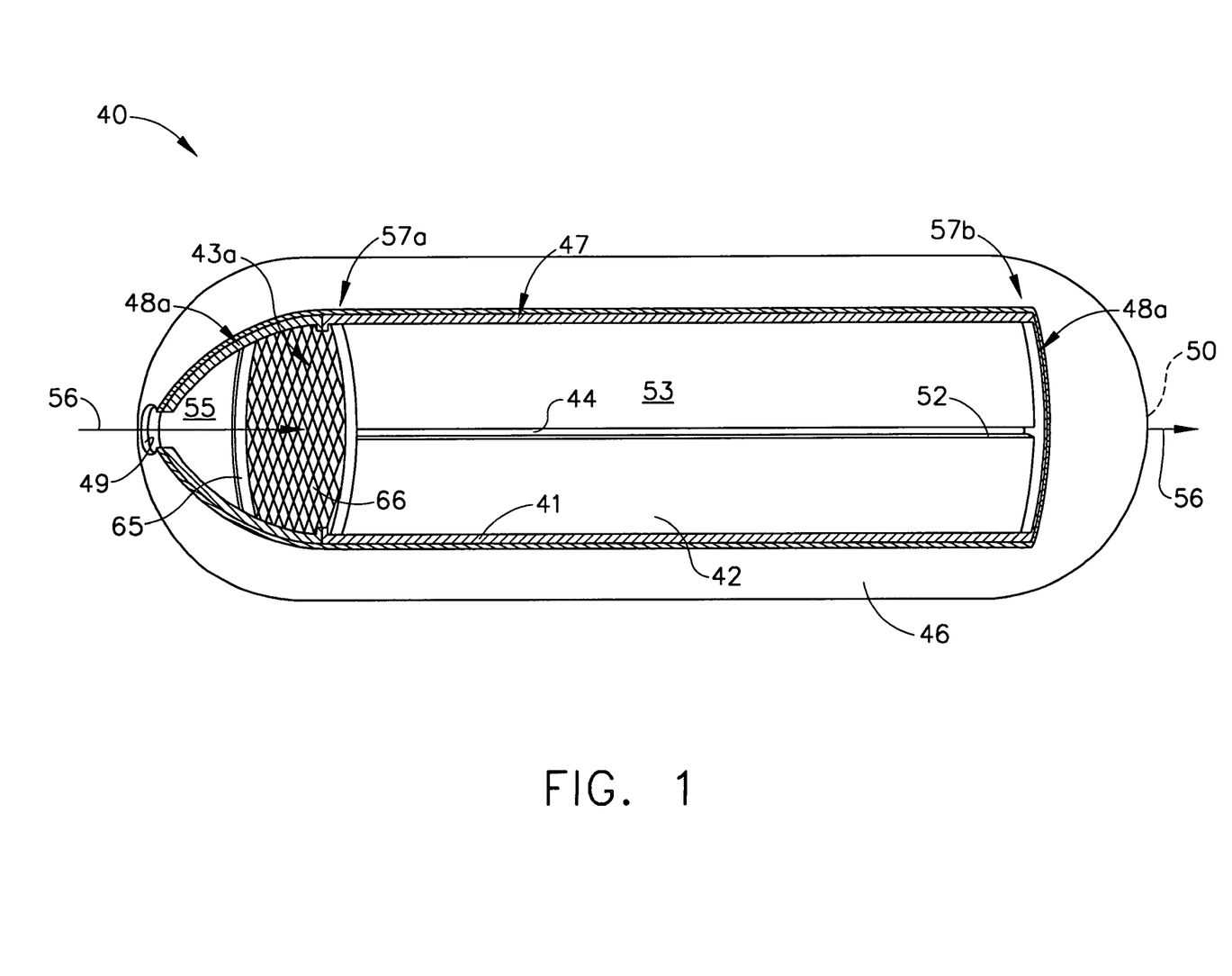
FIG. 1 is a partial cut-away view of a compact heat battery according to one embodiment of the present invention.
Figure 2:
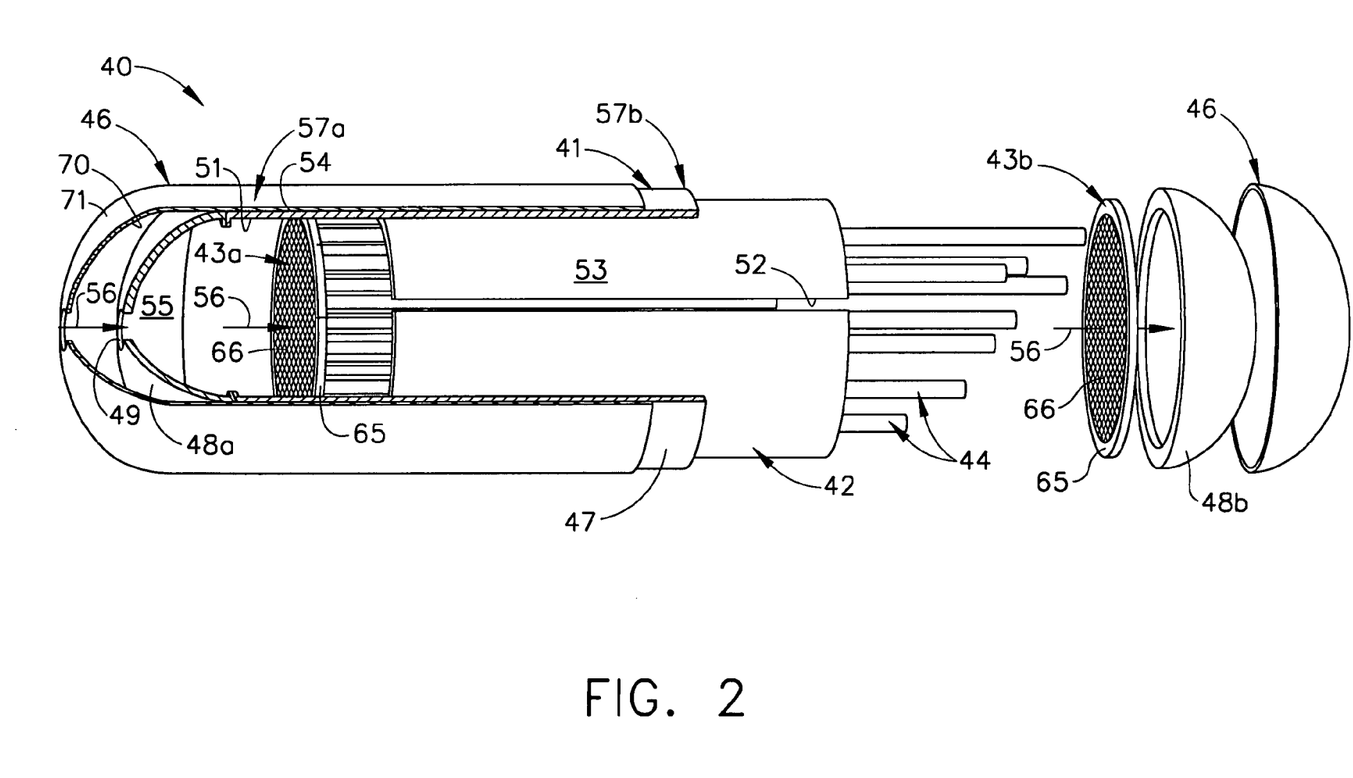
FIG. 2 is an exploded view of the compact heat battery of FIG. 1.
Figure 3:
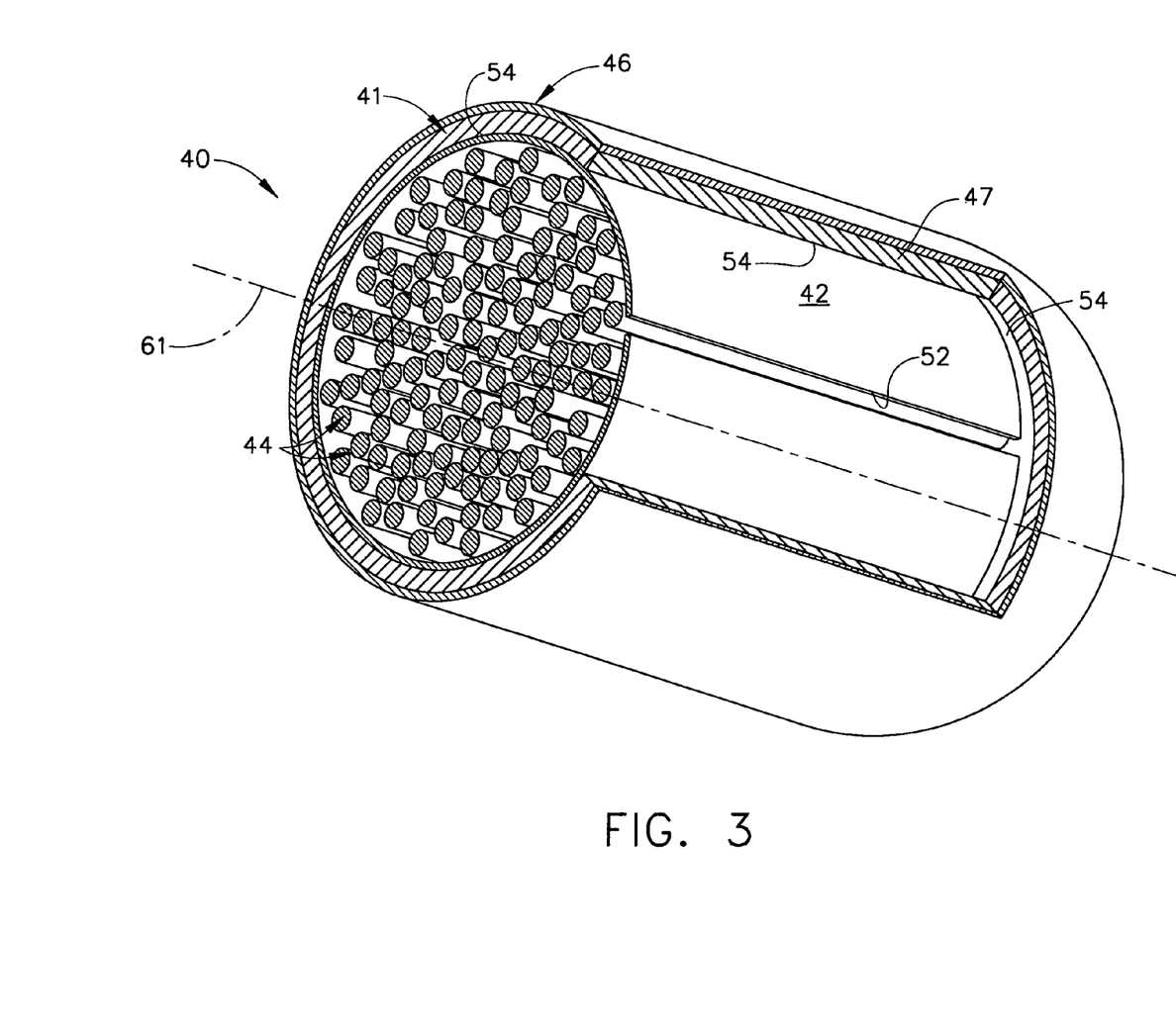
FIG. 3 is an isometric view of a portion of the compact heat battery of FIG. 1.

A compact heat battery (CHB) 40 according to an embodiment of the present invention is shown in FIGS. 1–3. The CHB 40 may comprise a casing 41, a tube containment sheath 42, a first baffle plate 43a, a second baffle plate 43b (FIG. 2), and a plurality of encapsulation tubes 44 containing a phase change material (PCM) 45 (see FIG. 9). An insulation envelope 46 may be positioned radially outward from the casing 41. A heat transfer fluid (HTF) 56 may enter the CHB 40 through an inlet opening 49, pass through the tube containment sheath 42, transfer thermal energy to the PCM 45 and exit the CHB 40 through an outlet opening 50.

The casing 41 may comprise a cylindrical pressure vessel, which may contain all of the components of the CHB 40 with the exception of the insulation envelope 46, as depicted in FIG. 2. The casing 41 may comprise a casing cylinder 47, a first end cap 48a and a second end cap 48b. The first end cap 48a may be in contact with a first end 57a of the casing cylinder 47, and the second end cap 48b may be in contact with a second end 57b of the casing cylinder 47 such that a chamber 53 is formed. The end caps 48a, 48b may be dome-shaped, as depicted. The end caps 48a, 48b may comprise other shapes, such as cone-shaped and disk-shaped.

The casing 41, as depicted in FIG. 1, may include the inlet opening 49. The inlet opening 49 may comprise an opening through the casing 41. The inlet opening 49 may be adapted such that the HTF 56 may flow through the inlet opening 49 to enter the chamber 53.

The casing 41, as depicted in FIG. 1, may include the outlet opening 50. The outlet opening 50 may comprise an opening through the casing 41. The outlet opening 50 may be adapted such that the HTF 56 may flow through the outlet opening 50 to exit the chamber 53.

For some applications, such as a single-pass flow application depicted in FIG. 1, the inlet opening 49 may be positioned in the first end cap 48a and the outlet opening 50 may be positioned in the second end cap 48b such that the HTF 56 may enter the chamber 53 through the first end cap 48a, pass through the casing cylinder 47, and then exit the chamber 53 through the second end cap 48b.

Figure 5:
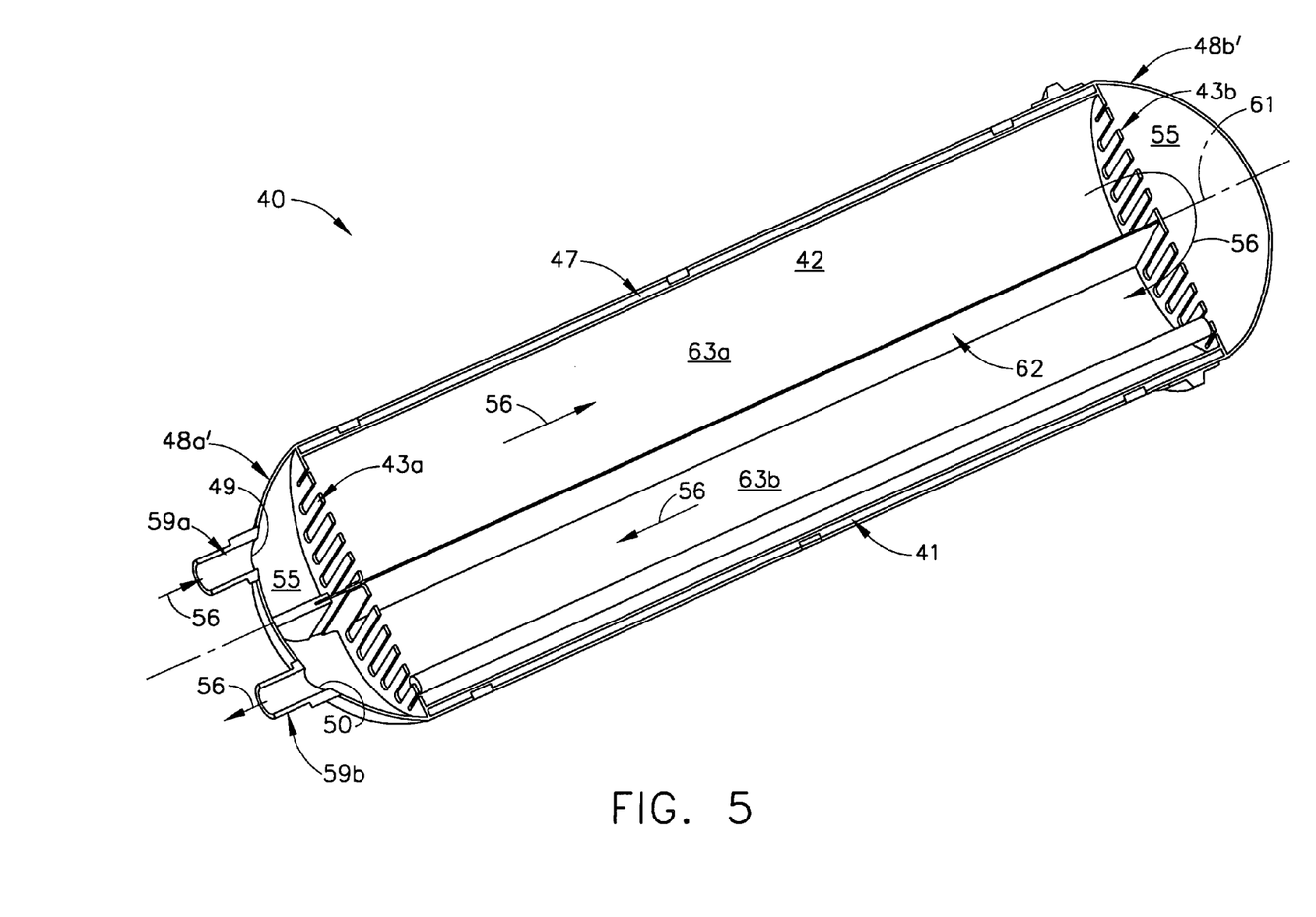
FIG. 5 is a cut-away view of the compact heat battery of FIG. 4.

Alternatively, for some applications, such as a two-pass flow application depicted in FIG. 5, both the inlet opening 49 and the outlet opening 50 may be positioned in the first end cap 48a' (inlet-outlet plenum cap) such that the HTF 56 may enter the chamber 53 through the first end cap 48a', pass through the casing cylinder 47 twice (down and back), and then exit the chamber 53 through the first end cap 48a'. The two-pass flow configuration, as depicted in FIG. 5, may include a septum 62 (described below) to provide flow path separation.

The composition of the casing 41 may vary and may depend on the composition of the HTF 56. For example, when the HTF 56 comprises 50/50 (volume) ethylene glycol/water (EGW), the casing 41 may comprise a plastic, such as an EGW-resistant plastic. For some applications, the casing 41 may comprise a fiber-reinforced plastic. Although the use of a plastic may provide the additional benefits of having low density and relatively low thermal conductivity when compared to metals, a metal may be used for some applications.

The casing 41 may be formed from one or more parts. For some applications, the casing cylinder 47 and the end caps 48a, 48b may comprise three separate parts; however, several molding options may be available. The end caps 48a, 48b and fittings 59a, 59b may be molded to cylinder sections as a single unit with two units bonded, clamped, or threaded together at a mid-cylinder seam (not shown). For another molding option, the end caps 48a, 48b and casing cylinder 47 may comprise separate parts as shown in FIG. 2. Alternatively, as in the two-pass flow configuration depicted in FIGS. 4–5, the casing cylinder 47 and the second end cap 48b' (turning section) may be a single integrated piece. The first end cap 48a' (inlet-outlet plenum cap) then may be bonded, clamped, or threaded at the open end of the casing cylinder 47.

The casing 41 may be the primary structure for transmitting and absorbing mechanical loads for the CHB 40 and may contain the HTF 56 pressure loading. All other components of the CHB 40 may "float" within the casing 41 and may be subjected only to minor loads of expansion and loads induced by vibration or shock to the casing 41. The thickness of the casing walls may vary with application.

For ease of installation, the casing 41 may include at least one mounting tab (not shown), an inlet fitting 59a and an outlet fitting 59b, as depicted in FIG. 5. The inlet fitting 59a may be in flow communication with the inlet opening 49 and may be adapted to couple with a length of piping (not shown). The outlet fitting 59b may be in flow communication with the outlet opening 50 and may be adapted to couple with another length of piping (not shown).

The tube containment sheath 42 may be positioned within the chamber 53 of the casing 41. The tube containment sheath 42 may comprise a cylindrical member, as depicted in FIG. 2. The tube containment sheath 42 may be positioned radially inward from the casing cylinder 47. Radial and axial may be defined with reference to a centerline axis 61 through the CHB 40. The outer diameter of the tube containment sheath 42 may be less than the inner diameter of the casing cylinder 47 such that a circumferential gap 54 is formed between the tube containment sheath 42 and the casing cylinder 47, as depicted in FIG. 3. For some applications, the outer diameter of the tube containment sheath 42 may be designed to allow for radial expansion of the encapsulation tubes 44 without having the tube containment sheath 42 press against an inner wall 51 of the casing 41.

The tube containment sheath 42 may include a split-seam 52, as depicted in FIG. 2. The split-seam 52 may comprise a single axial open seam along the length of the tube containment sheath 42 that may allow the tube containment sheath 42 to expand. The split-seam 52 may open during expansion and narrow during contraction of the encapsulation tubes 44. The split-seam 52 may also allow HTF 56 to leak into the circumferential gap 54 between the tube containment sheath 42 and the casing 41. The infiltration of HTF 56 into the circumferential gap 54 around the tube containment sheath 42 may maintain the encapsulation tube 44 bundle and the tube containment sheath 42 in hydrostatic equilibrium thus allowing the casing 41 to support the HTF 56 total pressure load.

The tube containment sheath 42 may also function to incorporate the encapsulation tubes 44 into a coherent bundle. The bundle of encapsulation tubes 44 may be held in compression by the circumferential spring tension of the tube containment sheath 42. During assembly, the tube containment sheath 42 may be held in a jig, which may open the split-seam 52 and expand the tube containment sheath 42 slightly to provide the spring tension. In other words, the diameter of the tube containment sheath 42 may be enlarged by force during assembly to accommodate the bundle of encapsulation tubes 44. The expansion of the tube containment sheath 42 during assembly may provide the spring tension because the diameter of the bundle of encapsulation tubes 44 may be greater than the diameter of the tube containment sheath 42 in an unexpanded state. The inner diameter of the tube containment sheath 42 may be designed to hold the encapsulation tubes 44 in slight compression at ambient assembly temperature. The tube containment sheath 42 may be designed to fit into the casing 41 such that the circumferential gap 54 may allow maximal expansion of the encapsulation tube 44 bundle, and subsequently, the tube containment sheath 42 with only negligible casing 41 expansion loads at the end of expansion travel. The inner diameter of the tube containment sheath designed such that the HTF 56 may flow through the baffle plates 43a, 43b. The baffle plates 43a, 43b may confine the encapsulation tubes 44 within an axial range of travel, which may allow for axial expansion of the encapsulation tubes 44 but prevent inadvertent movement of the encapsulation tubes 44 into an end cap plenum 55 (see FIG. 1). The end cap plenums 55 may be the portions of the chamber 53 that are towards the end caps 48a, 48b. For some applications, the perforated central portion 66 may be perforated (fenestrated) with square openings whose edge dimension may prevent flow of the encapsulation tube 44 bundle into the end cap plenum 55 from either end. Within the perforated central portion 66, the baffle plates 43a, 43b may present a minimal resistance to axial HTF 56 flow but contain the encapsulation tubes 44 from axial travel into the end cap plenums 55. For some applications, the flow area through the baffle plates 43a, 43b may be significantly larger than the flow area through the encapsulation tube 44 bundle and may add only a negligible pressure drop to the HTF 56 flow stream.

The non-perforated perimeter portion 65 may be adapted such that the baffle plates 43a, 43b may resist most of the axial bypass flow of the HTF 56 through the circumferential gap 54. The radial width of the non-perforated perimeter portion 65 may be about equal to the radial width of the circumferential gap 54 at assembly. The perimeter of each baffle plate 43a, 43b may be non-perforated sufficiently far inward along the radius in order to resist HTF 56 flow from bypassing around the bundle of encapsulation tubes 44, along the inner wall 51 of the casing 41 and into the circumferential gap 54.

The encapsulation tubes 44 may be positioned between the baffle plates 43a, 43b and within the tube containment sheath 42. Each encapsulation tube 44 may comprise a drawn, extruded, or seam welded tube. The length of the encapsulation tube 44 may be about equal to the length of the tube containment sheath 42. A diameter 60 (see FIG. 6) of the encapsulation tube 44 may vary and may depend on factors including the dimensions of the tube containment sheath 42, the mass of the PCM required, and the application.

The volume of each encapsulation tube 44 may be designed to accommodate the required amount of expansion both from the liquid and solid phase expansion of the PCM 45 as well as for the volume change during phase transition. Hence in solid phase there may be a significant void (not shown) in each encapsulation tube 44. In horizontal mounting, this ullage may preferentially accumulate at the top of the circular cross section of the encapsulation tube 44.

A wall thickness 72 (see FIG. 9) of the encapsulation tube 44 may be a parameter in controlling the total weight of the CHB 40. However, CHB 40 weight may be balanced against the handling and durability of the encapsulation tubes 40. The wall thickness 72 may be assessed against the tube diameter 60 and hence the number of encapsulation tubes 44. For some applications, there may be a lower bound on the number of encapsulation tubes 44 since the amount of heat liberated from each encapsulation tube 44 may be balanced against its useable area in order to deliver the desired rate of heat transfer. The encapsulation tubes 44 may comprise a material, such as a metal. For some applications, the encapsulation tube 44 may comprise stainless steel, aluminum, nickel, or conductive plastic. The composition of the encapsulation tube 44 may depend on factors including the composition of the PCM 45 and the operating temperatures of the CHB 40. For example, for some low temperature applications wherein the PCM 45 comprises a paraffin wax, the encapsulation tube 44 may comprise a polymer resin. The composition of the encapsulation tube 44 may be such that the encapsulation tube 44 may be compatible with the PCM 45 and may be able to withstand the CHB's operating temperatures (ex. not melt).

Figure 9:
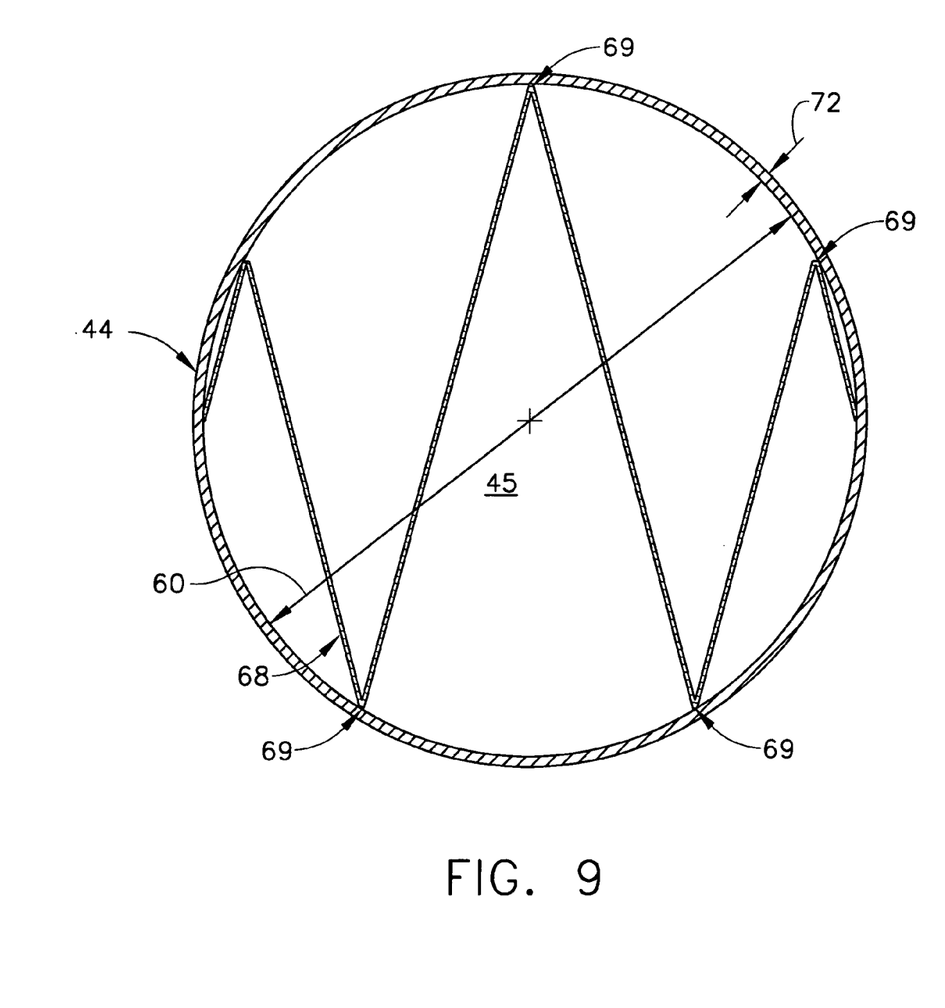
FIG. 9 is a cross-sectional view of an encapsulation tube according to one embodiment of the present invention.

Each encapsulation tube 44, as depicted in FIG. 9, may hermetically seal the phase change material (PCM) 45 from the environment and from the HTF 56 flow. The PCM 45 may comprise any heat absorbing or heat storing material. For some applications, the PCM 45 may comprise a material selected from the group consisting of paraffins, non-paraffin organics, hydrated salts and fused salts. The paraffins may comprise high molecular weight paraffins of the form $C_nH_{2n+1}$, where n is usually an even integer. The non-paraffin organics may include fatty acids. For some applications, the hydrated salts may comprise hydroxides. The fused salts may include binary or tertiary fused eutectic salts. The composition of the PCM 45 may depend on factors including tube corrosiveness and toxicity. For example, hydroxide salts may be encapsulated best in stainless steel or nickel, with nickel better for long term storage. Nickel may be impervious to the caustic reactivity of the hydroxide salt and may have a better thermal conductance to heat transfer in comparison to stainless steel. In general, paraffins may be the least corrosive and toxic, other organics may be a mixed bag of corrosiveness and toxicity, hydrated salts and fused salts may be generally corrosive and may have slightly higher toxicity levels. Hydroxides may be more corrosive when water is available to mediate the reaction.

Figure 6:
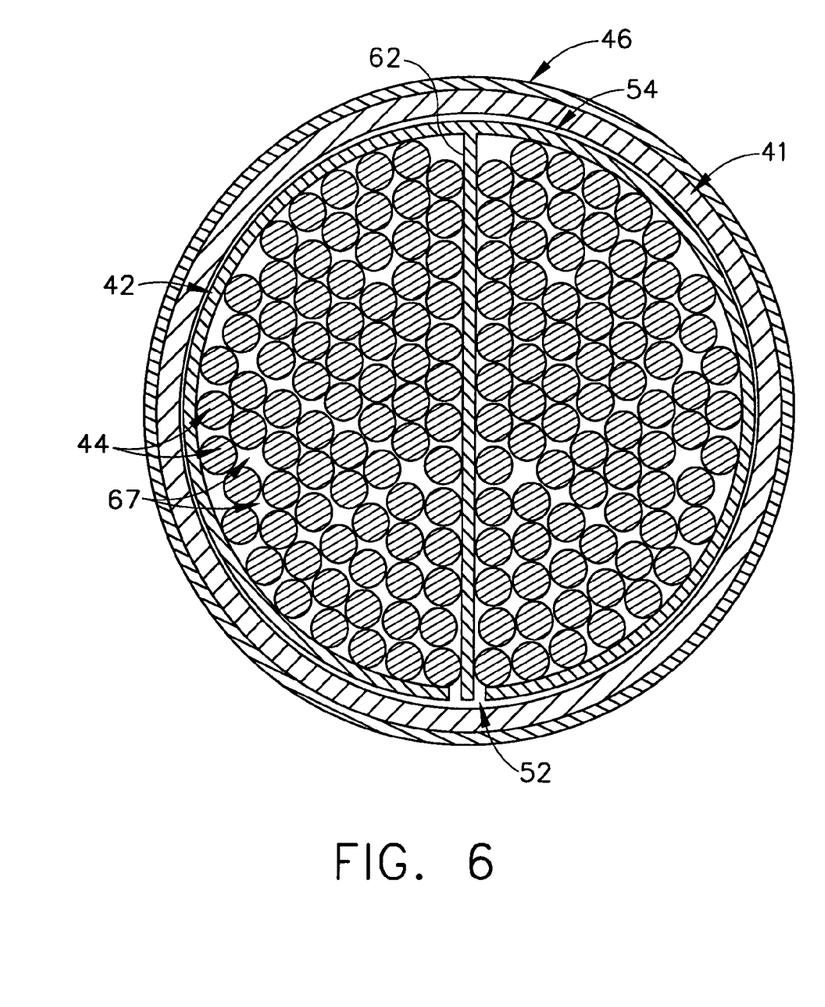
FIG. 6 is a cross-sectional view of the natural ordering of encapsulation tubes packed within a tube containment sheath according to another embodiment of the present invention.
Figure 7:
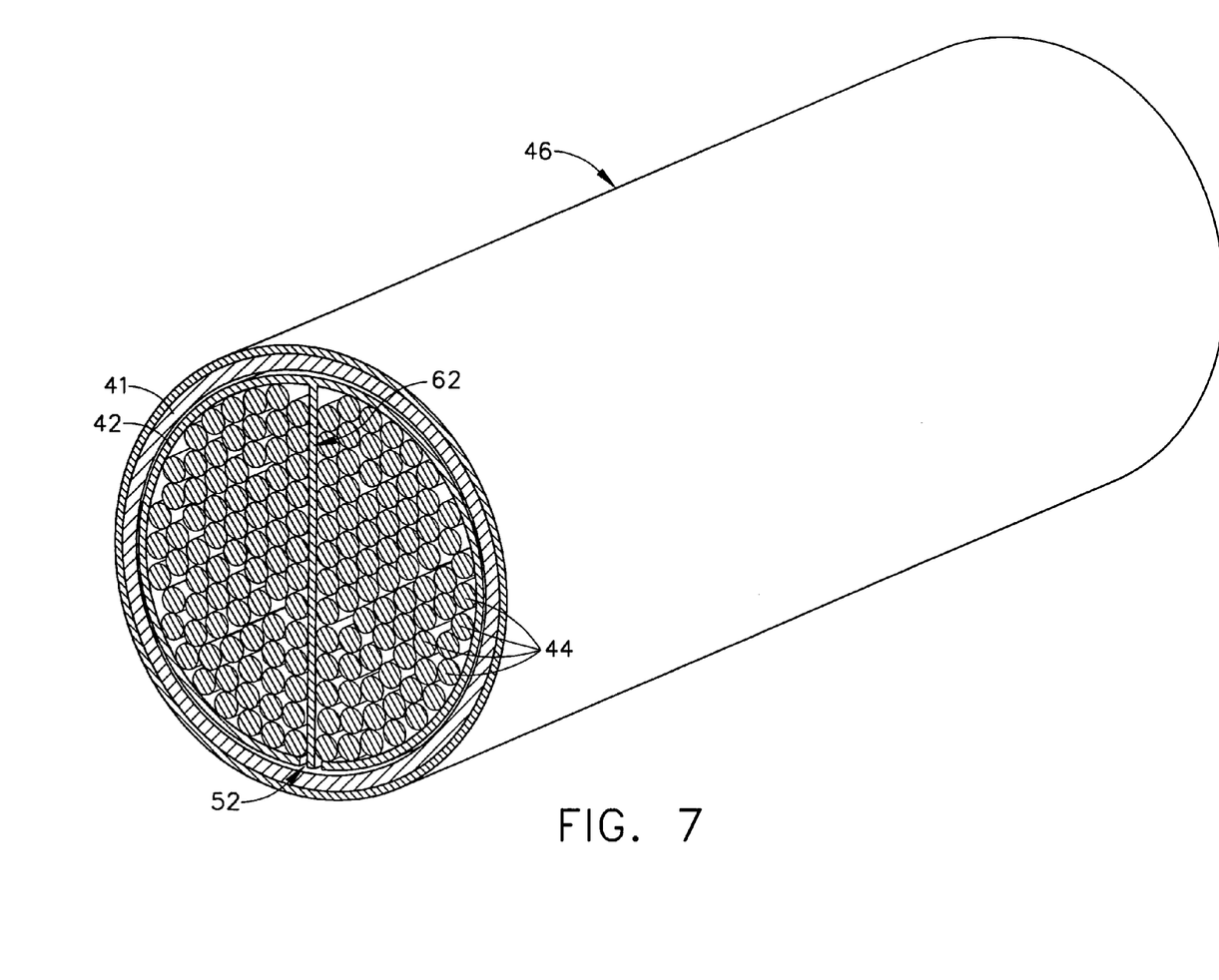
FIG. 7 is cut away isometric view of the ordering of encapsulation tubes packed within of a two-pass flow system according to one embodiment of the present invention.
Figure 8:
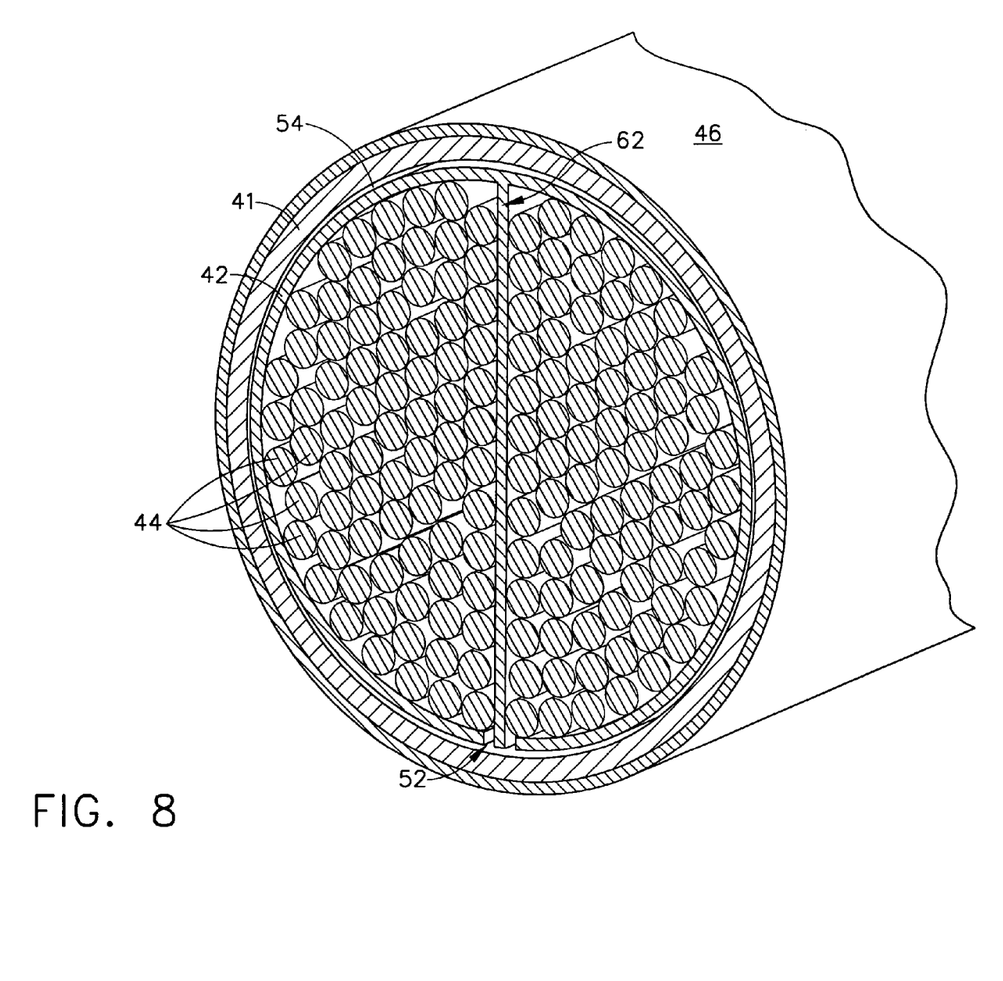
FIG. 8 is a close-up view of FIG. 7.

For some applications, each encapsulation tube 44 may contain only a small amount of the total PCM charge. For example, each encapsulation tube 44 may contain an equal and small percentage of the total of the CHB PCM charge as depicted in the embodiment of FIG. 6. The number of encapsulation tubes 44 may depend on the heat discharge requirements of the application and the dimensions of the encapsulation tubes 44. The encapsulation tubes 44 may provide sufficient area and heat transfer coefficient to discharge the required amount of heat at a rate necessary to meet the discharge requirements. For some applications, a large number of tubes may be required to provide a small enough tube diameter 60 to balance the amount of heat liberated from the PCM 45 with the rate at which that heat may be required to be discharged.

For some applications, as depicted in FIG. 9, a capsule insert 68 may be embedded in the PCM 45. The capsule insert 68 may comprise any member adapted to create slip-planes in the solid PCM, breaking up the solid and reducing encapsulation tube stress. One embodiment of the capsule insert 68 may comprise an extruded fan-fold insert extending axially through the PCM 45. The capsule insert 68 may comprise a sheet having at least one fold 69. The fold 69 may extend the length of the sheet in an axial direction. For some applications, the capsule insert 68 may comprise a material, such as PTFE Teflon™ (poly(tetrafluoroethylene)). For some applications, the thickness of the capsule insert 68 may be between about 0.0003 mm and about 0.001 mm. The axial length of the capsule insert 68 may be less than the axial length of the encapsulation tube 44. The width of the capsule insert 68 may vary and may depend on factors including the diameter 60 of the encapsulation tube 44 and the number of folds 69.

For ease of assembly, the encapsulation tube 44 may be extruded with one end closed. For some applications, the encapsulation tube 44 may be filled vertically with a solid phase PCM 45. The solid PCM 45 may be a densified powder with the encapsulation tube 44 filled from the bottom up by an ejector that delivers a pre-selected weight of PCM 45. The encapsulation tube 44 may be filled such that the void remains. In addition to accommodating PCM volume change, the void may allow for plugging or crimping of the remaining open tube end. A plug seam (not shown) or crimp seam (not shown) may be welded in the final sealing operation.

During packing, the tube containment sheath 42 may be held in jig, which may expand it slightly. The encapsulation tubes 44 may be pre-arranged in a template to provide for smooth assembly. Alternatively, the encapsulation tubes 44 can be hand packed. FIG. 3 illustrates a representative number of encapsulation tubes 44 but may not show the proper packed configuration of the tubes 44. The final pattern of encapsulation tubes 44 for one embodiment may be better seen in FIG. 6. For some applications, it may be mathematically possible to ascertain the maximum packing number of encapsulation tubes 44 within the tube containment sheath 42. The ordering of encapsulation tubes 44 for an alternate non-limiting embodiment is depicted in FIG. 12 6–8. The embodiment depicted in FIGS. 6–8 may be a two-pass flow configuration and may include the septum 62, while the embodiment depicted in FIG. 12 may be a single-pass flow configuration. The tube packing configuration may vary and may depend on factors including the number of encapsulation tubes 44, the dimensions of tube containment sheath 42 and the dimensions of the encapsulation tubes 44.

Once the encapsulation tubes 44, tube containment sheath 42 and baffle plates 43a, 43b are assembled and inserted into the casing 41, the casing 41 may be sealed by threaded, clamped, or bonded joints along one or more circumferential seams (not shown). For some applications, the insulation envelope 46 may then be attached the casing 41.

Figure 4:
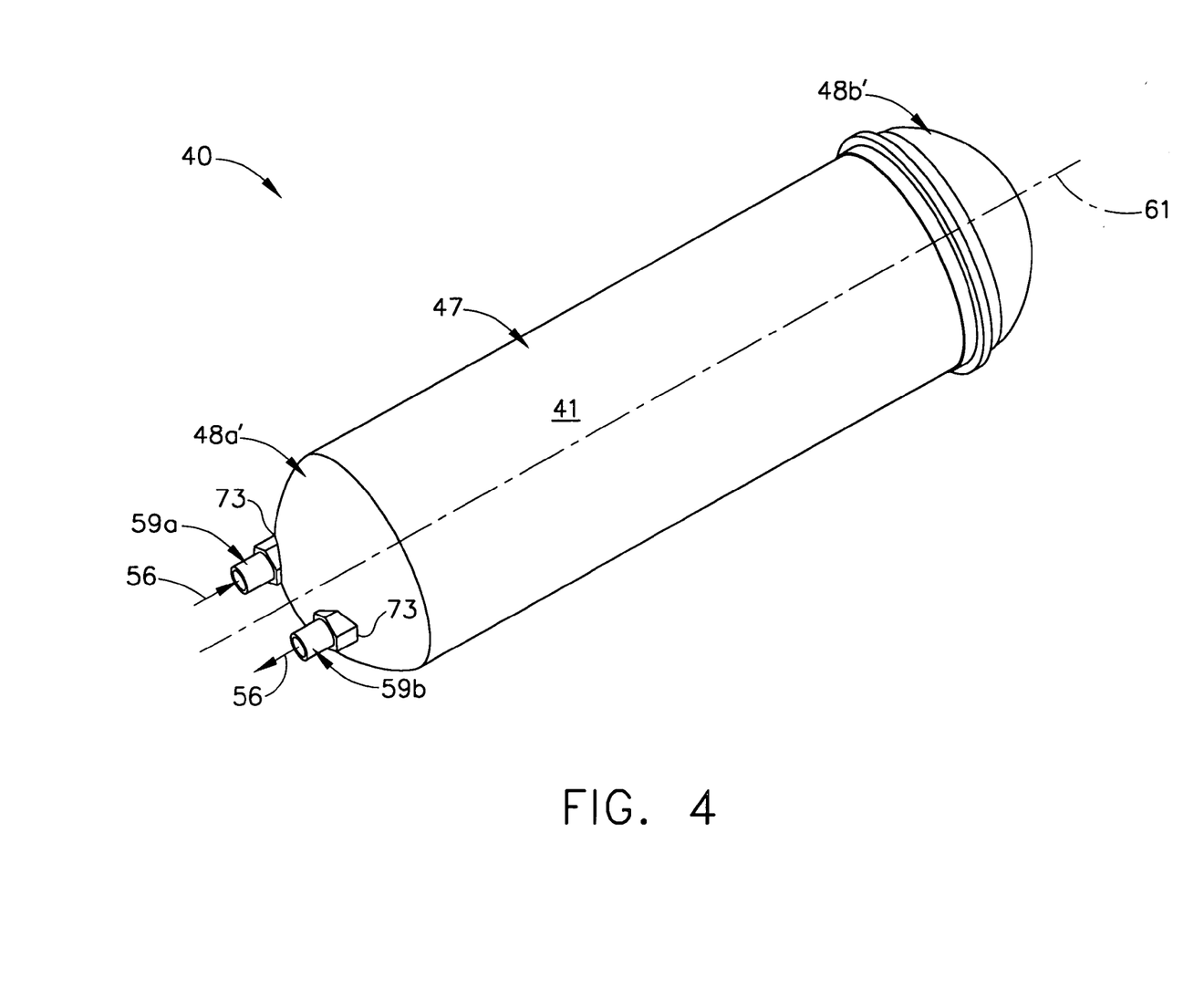
FIG. 4 is an isometric view a compact heat battery according to another embodiment of the present invention.

The outermost layer of the CHB 40 may comprise the insulation envelope 46, as depicted in FIG. 2. The insulation envelope 46 may comprise a blanket of insulating material. For some applications, the insulation envelope may comprise a fiberglass insulation material. For some applications, the insulation envelope may comprise a microporous insulation material. The density and lofted thickness of the insulating material may vary with application. The insulation envelope 46 may be attached to the outer surface of the casing 41. For some applications, the insulation envelope 46, as depicted in FIG. 4, may be designed to cover exposed areas of the CHB 40 and to provide penetrations 73 for inlet/outlet fittings 59a, 59b and mounting tabs.

An inward facing surface 70 (see FIG. 2) of the insulation envelope 46 may be bonded to the casing cylinder 47 and end cap 48a, 48b surfaces with dots of a bonding agent (not shown) or with a double-sided tape (not shown). An outward facing surface 71 may comprise a thin sheet of plastic (not shown) or metal shielding (not shown) which may stand off from the inlet and outlet fittings 59a, 59b to maintain loft of the insulation material.

In an alternate embodiment, the CHB 40 may integrate the insulation envelope 46 and the casing 41 into an evacuated, sealed, double-walled, vacuum container (not shown). The vacuum container may comprise a thin gauge material, such as nickel or stainless steel. The evacuated void of the vacuum container may include an insulating material to provide redundancy against a loss of vacuum integrity.

Figure 10:
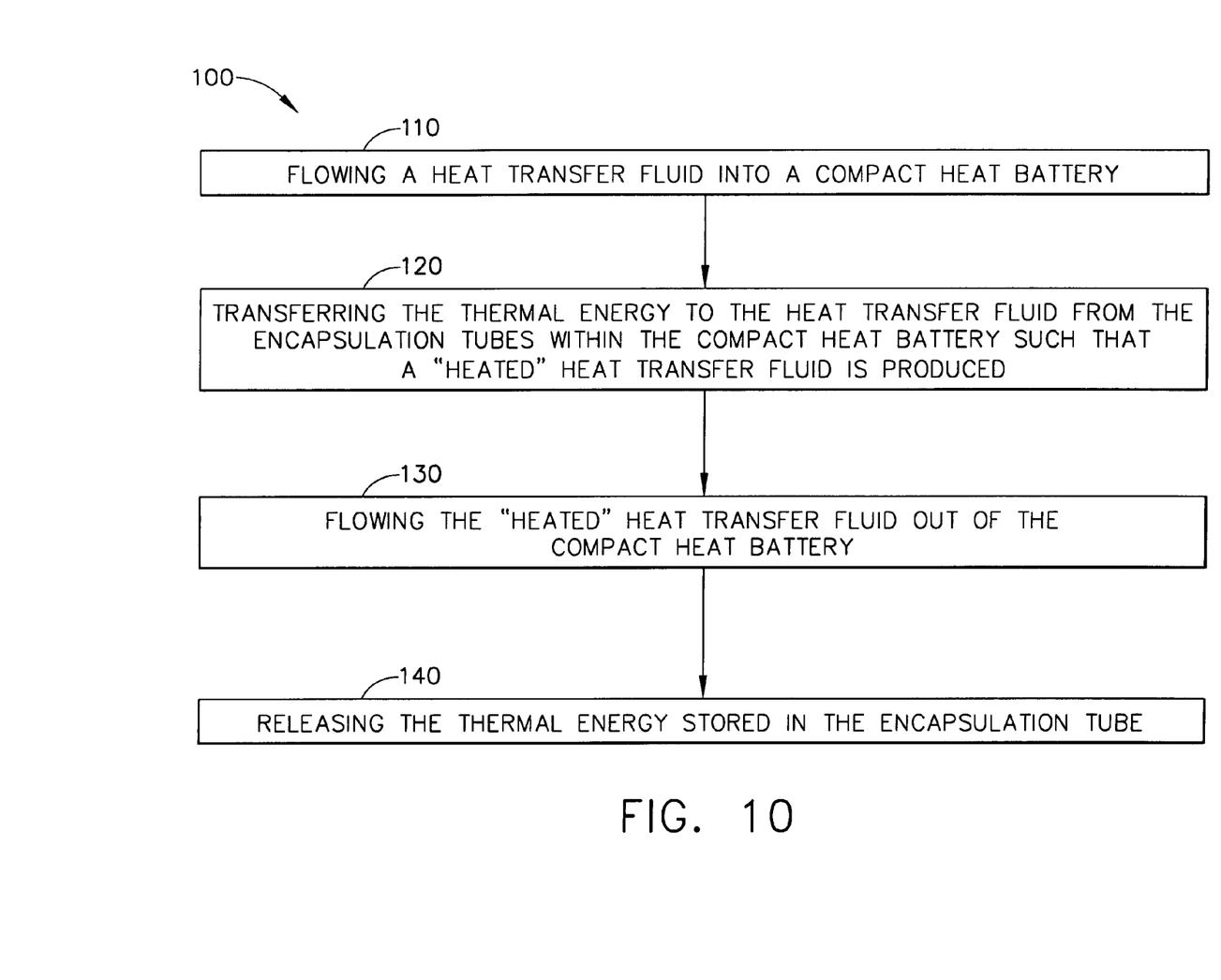
FIG. 10 is a flow chart of a method for transferring thermal energy to a heat transfer fluid from a thermal energy storage material (discharge) according to one embodiment of the present invention.
Figure 11:
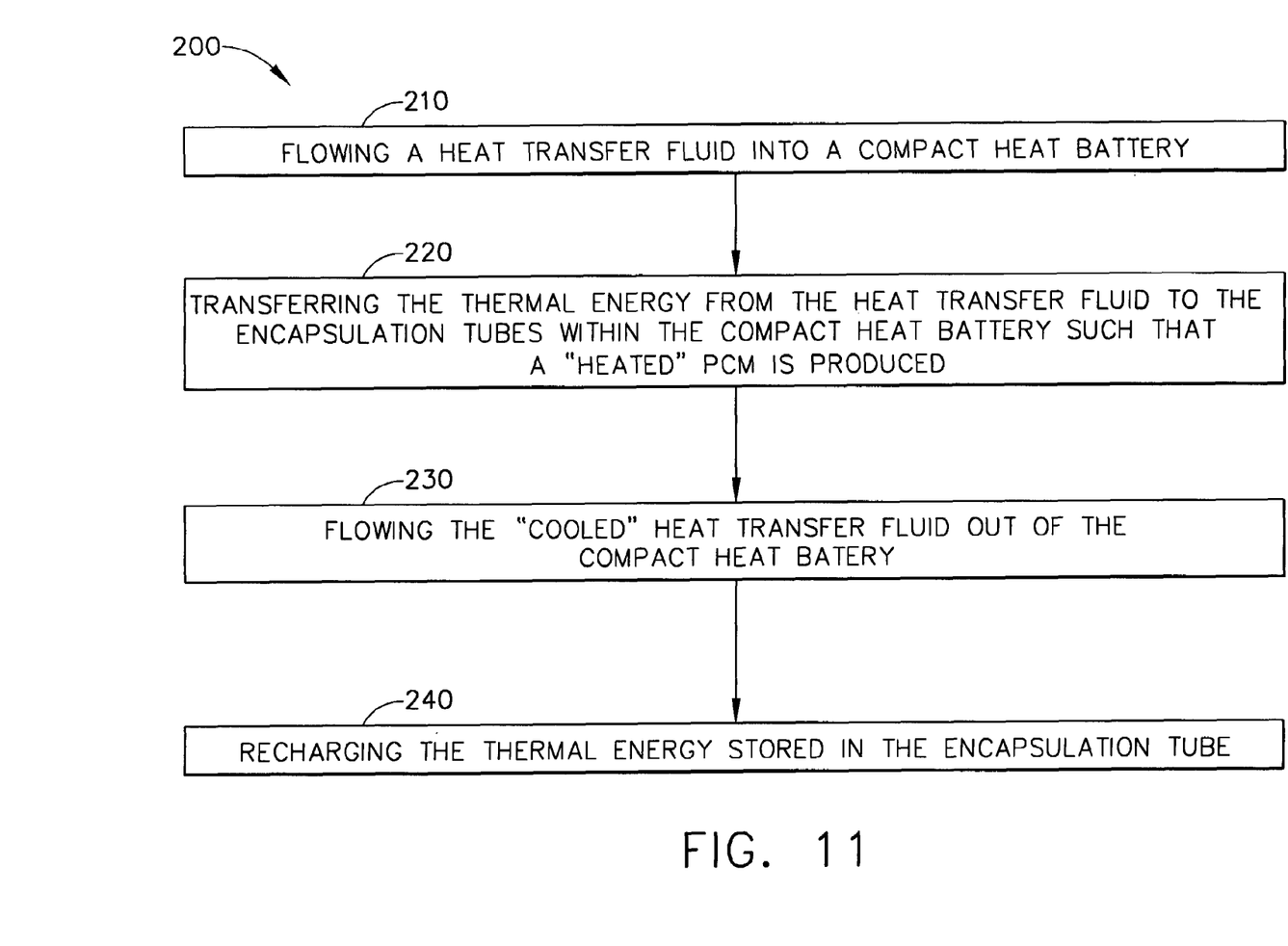
FIG. 11 is a flow chart of a method for transferring thermal energy from a heat transfer fluid to a thermal energy storage material (recharge) according to one embodiment of the present invention.
Figure 12:
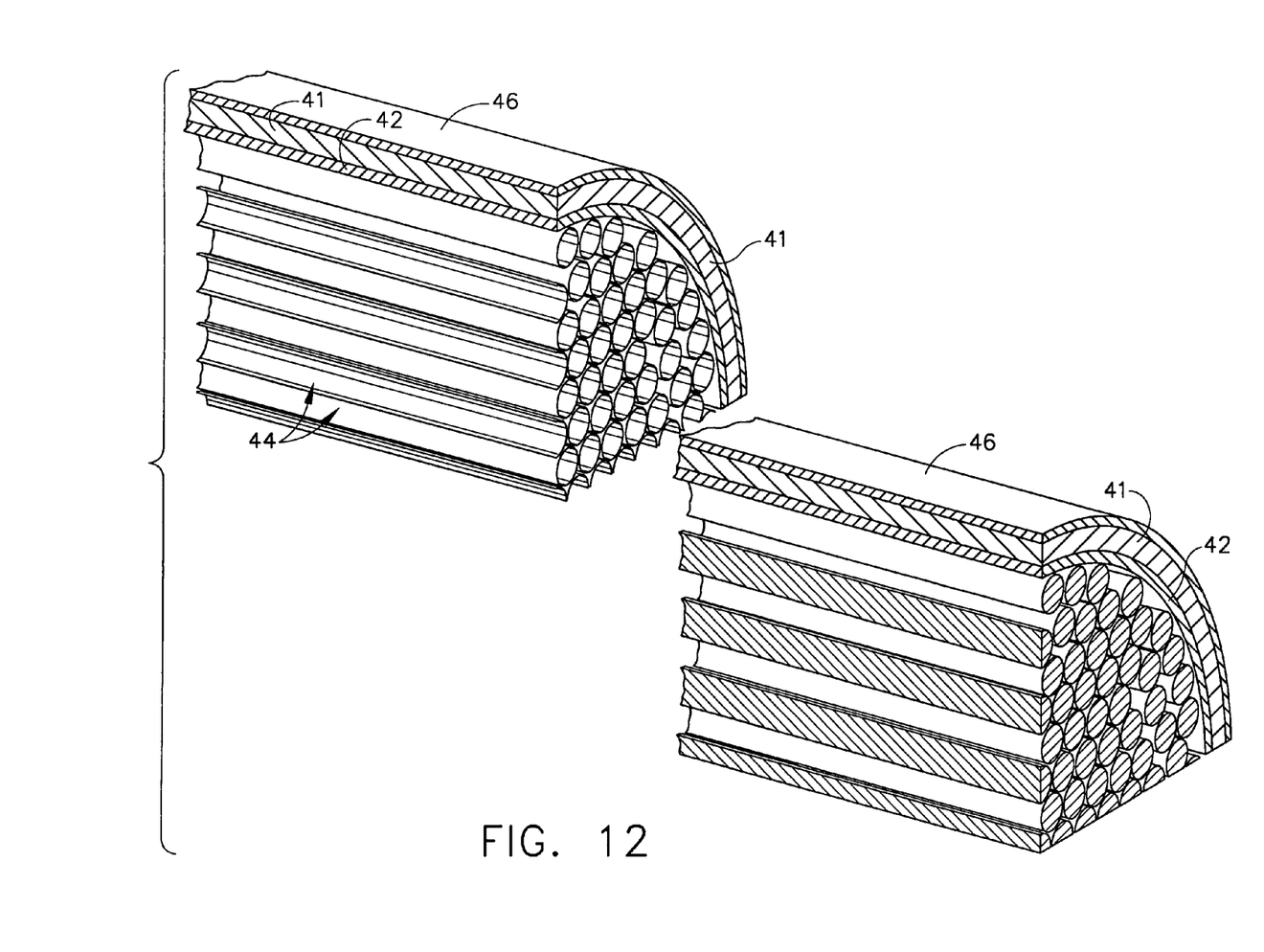
FIG. 12 is a finite element model of a compact heat battery according to one embodiment of the present invention.

Methods 100 and 200 of discharging and storing thermal energy are depicted in FIG. 10 and FIG. 11. The method 100 may comprise a step 110 of flowing a HTF 56 into a CHB 40, a step 120 of transferring the thermal energy to the HTF 56 from encapsulation tubes 44 within the CHB 40 such that a "heated" HTF is produced, and a step 130 of flowing the "heated" HTF out of the CHB. The method 100 may further comprise a step 140 of releasing the thermal energy stored in the encapsulation tubes 44.

The step 110 of flowing a HTF 56 into a CHB 40 may comprise flowing the HTF 56 through an inlet opening 49 of the CHB 40. The step 110 may comprise flowing the HFT 56 such that the HFT 56 flows into an end cap plenum 55 formed inside of a first end cap 48a of the CHB 40. The HTF 56 may then flow through a first baffle plate 43a of the CHB 40.

The step 120 of transferring the thermal energy to the HTF 56 may comprise flowing the HTF 56 into a tube containment sheath 42 of the CHB 40 such that the HTF 56 contacts the encapsulation tubes 44. The step 120 may comprise flowing the HTF 56 through a plurality of interstitial spaces 67 (see FIG. 6) between the encapsulation tubes 44. The HTF 56 may then flow through a second baffle plate 48b. The step 120 may comprise transferring the thermal energy from a PCM encapsulated within the encapsulation tube 44 to provide the "heated" HTF.

The step 130 of flowing the "heated" HTF out of the CHB 40 may comprise flowing the "heated" HTF through an outlet opening 50 of the CHB 40. In some embodiments, such as a single-pass flow configuration, the step 130 may comprise flowing the "heated" HTF through the outlet opening 50 positioned in a second end cap 48b. In some embodiments, such as a two-pass flow configuration, the step 130 may comprise flowing the "heated" HTF through the outlet opening 50 positioned in the first end cap 48a. In the two-pass flow configuration the HTF 56 may pass through the tube containment sheath 42 of the CHB 40 twice (down and back) before exiting the CHB 40 through the outlet opening 50.

The steps 210 through 240 of recharging the thermal energy stored in the encapsulation tubes 44 may comprise flowing the "heated" HTF into the CHB 40 such that the "heated" HTF contacts the encapsulation tube 44 to complete a cooling-heating cycle of the HTF.

As can be appreciated by those skilled in the art, embodiments of the present invention provide improved compact heat batteries. Embodiments of the present invention provide heat storage systems having an increased density of encapsulation tubes. The increased tube density of the storage system may provide increased heat absorption and decreased system dimensions for some applications.

It should be understood, of course, that the foregoing relates to exemplary embodiments of the invention and that modifications may be made without departing from the spirit and scope of the invention as set forth in the following claims.

We claim:

1. An assembly comprising:
   a casing having a casing cylinder, a first end cap and a second end cap;
   a tube containment sheath positioned radially inward from said casing cylinder; and
   at least one encapsulation tube positioned radially inward from said tube containment sheath, said encapsulation tube including a phase change material.

2. The assembly of claim 1, wherein said first end cap includes an inlet opening and an outlet opening.

3. The assembly of claim 1, wherein said first end cap includes an inlet opening and said second end cap includes an outlet opening.

4. The assembly of claim 1, wherein said tube containment sheath has a split-seam.

5. The assembly of claim 1, wherein said tube containment sheath includes a septum such that an inlet flow path and a return flow path are formed.

6. The assembly of claim 1, further comprising:
   a first baffle plate positioned between said first end cap and said tube containment sheath; and
   a second baffle plate positioned between said second end cap and said tube containment sheath.

7. The assembly of claim 1, further comprising an insulation envelope attached to said casing.

8. The assembly of claim 1, wherein said encapsulation tube includes a capsule insert embedded in said phase change material.

9. The assembly of claim 1, wherein said casing comprises a double-walled vacuum container having an evacuated void.

10. The assembly of claim 9, wherein said evacuated void includes an insulation material.

11. An assembly comprising:
    a cylindrical pressure vessel having a chamber;
    a tube containment sheath disposed within said chamber, said tube containment sheath having a split-seam; and
    at least one encapsulation tube positioned radially inward from said tube containment sheath.

12. The assembly of claim 11, wherein said cylindrical pressure vessel includes a first end cap and a second end cap.

13. The assembly of claim 12, wherein said first end cap includes an inlet opening and said second end cap includes an outlet opening.

14. The assembly of claim 12, wherein said first end cap includes an inlet opening and an outlet opening.

15. The assembly of claim 11, further comprising a disk shaped structure having a perforated central portion, said disk shaped structure positioned between said tube containment sheath and an end cap of said cylindrical pressure vessel such that axial movement of said encapsulation tube is restricted.

16. The assembly of claim 11, wherein said tube containment sheath includes a separation plane extending the length of said tube containment sheath.

17. The assembly of claim 11, wherein said encapsulation tube includes a phase change material.

18. The assembly of claim 17, further comprising a capsule insert embedded in said phase change material.

19. The assembly of claim 18, wherein said capsule insert comprises an extruded fan-fold insert extending axially through said phase change material.

20. An assembly comprising:
    a casing having a casing cylinder, an inlet-outlet plenum cap and a turning section;
    a cylindrical member positioned radially inward from said casing cylinder such that a circumferential gap is formed; and
    a bundle of encapsulation tubes positioned radially inward from said cylindrical member, said bundle of encapsulation tubes including a thermal energy storage material.

21. The assembly of claim 20, further comprising:
    a first baffle plate positioned between said inlet-outlet plenum cap and said cylindrical member; and
    a second baffle plate positioned between said turning section and said cylindrical member.

22. The assembly of claim 21, wherein said first baffle plate includes a non-perforated perimeter portion having a radial width about equal to a radial width of said circumferential gap.

23. The assembly of claim 20, wherein said cylindrical member includes a septum such that an inlet flow path and a return flow path are formed.

24. The assembly of claim 20, wherein said cylindrical member includes a split-seam.

* * * * *